Patented Feb. 23, 1932

1,846,844

UNITED STATES PATENT OFFICE

FRANK M. CLARK, OF PITTSFIELD, MASSACHUSETTS, ASSIGNOR TO GENERAL ELECTRIC COMPANY, A CORPORATION OF NEW YORK

PROCESS OF TREATING ALUMINUM REISSUED

No Drawing. Application filed July 16, 1929. Serial No. 378,820.

The present invention relates to a treatment of aluminum which has the object in view of producing a strongly adherent dielectric coating on the aluminum. It is a particular object of my invention to produce on aluminum foil a dielectric coating which will render the coated aluminum foil suitable for use as an electrode in condensers without the necessary interposition of any other dielectric material.

Numerous methods have been suggested heretofore whereby aluminum may be provided with a dielectric coating, as, for example, by an electrolytic treatment in which the aluminum to be treated functions as an electrode of an electrolytic cell. The coating formed by the electrolytic method is not suitable for condenser dielectric. It has also been suggested to produce colored effects upon the aluminum by chemical treatment without the application of externally applied electric current, that is, without electrolysis. Such coatings, however, as heretofore produced have been too thin and of too low insulation value to be suitable for use as condenser dielectrics or other insulating purposes.

In accordance with my invention a hard, adherent, insulating coating is formed on aluminum, or aluminum alloys, by treating the metal with a solution containing both silicate of an alkali metal and an alkaline reagent, preferably a hydroxide of an alkali or alkaline earth metal. In some cases ammonium hydroxide advantageously also may be present. The silicate appears to function as a retarder which modifies the otherwise too violent effect of the alkali.

The nature of the insulating coating which is formed in accordance with my invention has not been determined with complete certainty but insofar as its nature has been determined the evidence indicates that it consists largely of oxide of aluminum together with other compounds of aluminum depending on the nature of the electrolyte. For example, when a silicate of an alkali is used as a retarder some silicate of aluminum is formed. In any event, properties of aluminum treated in accordance with my invention are especially suited for dielectric purposes.

In carrying out my invention the foil, or other article of aluminum, which is to be provided with a dielectric coating is subjected to the chemical action of an alkaline reagent which may be prepared as below described, without the application of any externally applied electrical energy. The length of time of treatment varies in accordance with the results to be produced and in accordance with the concentration of the reagent, the temperature and other conditions. In general the temperature is maintained at about 65 to 75° C. The aluminum is maintained in contact with the alkali agent under average conditions for periods up to 13 minutes.

An alkali solution suitable for carrying out my invention may contain about 2 to 6% by weight of sodium hydroxide, about 1.5 to 3% of ammonia ($NH_3$) and about 2.5 to 12% of a retarder which preferably consists of sodium silicate. The ammonia may be omitted in some cases and in any event it is not requisite that the proportion of the ammonia should be maintained within the particular values given above. In place of sodium hydroxide other alkali reagents may be employed, for example, the hydroxides of other metals of the alkali group, such as potassium hydroxide or a hydroxide of the alkaline earth group, as, for example, calcium hydroxide. Collectively such hydroxides are termed strongly alkaline metal base hydroxides. In place of the sodium silicate other modifying reagents may be employed, as, for example, the tetraborate, fluoride or carbonate of sodium or other alkaline metal or the oxalate, carbonate or chloride of ammonium. In some cases the retarder may consist of a mixture of compounds of the above group. The following mixtures have proved to be suitable as retarders: The silicate and fluoride of sodium; the chloride of ammonium, and silicate of sodium; the chloride of ammonium and fluoride of sodium, all of these retarders being salts of a strong base.

The concentration of the solution also may be varied as already indicated by the above range of percentages. When bringing an aluminum foil, wire or other article into contact with the alkaline reagent by conducting such aluminum body in continuous lengths through the alkali reagent, I prefer to employ relatively dilute solutions, for example using the ingredients of the above example in amounts falling in the lower end of the ranges of proportions above given.

After a desired dielectric coating is produced on the foil, wire, or other aluminum article, it is washed upon removal from the alkali reagent, and after drying is ready for use. Foil provided with such dielectric coating may be employed in the fabrication of condensers either with or without added dielectric material, such as paper, between the condenser elements.

The dielectric film produced in accordance with my invention is very fine grained and adherent. It resists electrical breakdown upon the application of voltages up to about 33,000 volts. It has a power factor better than .5%. The insulation resistance of a 1 microfarad condenser containing aluminum foil treated in accordance with my invention is of the order of magnitude of 6,000 megohms. The electrical capacity of the film varies, of course, with its thickness, but as an illustrative example 1 may state that a film about .3 to .5 mil in thickness and having an area of about 3 square feet has a capacity of about 1 microfarad.

It is necessary, or even desirable, to wash and dry aluminum foil treated in accordance with my invention before using the foil in the fabrication of electric capacitors. In some cases such treated foil may be wound up, or otherwise fabricated into condensers, with or without paper or other insulation interposed between adjacent turns or electrodes, while still wet or damp, with electrolyte, thereby forming an electrolytic capacitor.

What I claim as new and desire to secure by Letters Patent of the United States, is:

1. The process of forming an electrical insulating coating on aluminum which consists in bringing the same without the application of externally applied electrical energy into contact with an aqueous solution of a silicate of an alkali metal, said silicate being associated with hydroxide of alkali metal in sufficient quantity to produce by chemical action a dielectric coating on said aluminum.

2. The process of oxidizing aluminum which consists in acting on said metal without the application of externally applied electrical energy with a solution of an hydroxide of an alkaline metal and a salt of said metal whereby the chemical effect of said hydroxide on said aluminum is retarded, the latter ingredient being in preponderant proportion by weight.

3. The process of treating aluminum which consists in bringing the same into contact without the application of externally applied electrical energy with an aqueous solution containing about 2.5 to 12 per cent of a silicate of an alkali metal, and about 2 to 6 per cent of an alkali metal hydroxide.

4. The process of producing an adherent, insulating coating on aluminum which consists in immersing the aluminum to be coated without the application of externally applied electrical energy in a solution containing by weight about 2.5 to 12% sodium silicate, about 2 to 6% of sodium hydroxide and about 1.5 to 2.5% ammonia.

5. The process of treating aluminum which consists in bringing said metal without the application of externally applied electrical energy into contact with an aqueous solution containing a silicate of an alkali metal and hydroxide of calcium.

6. The process of treating aluminum to produce an insulating coating thereon which consists in bringing said metal without the application of externally applied electrical energy into contact with an aqueous solution containing a salt of an alkaline metal and hydroxide of calcium.

7. The process of producing an adherent, insulating coating on aluminum which consists in immersing aluminum to be coated in a solution containing both a hydroxide and a salt of an alkaline base without application of externally applied electrical energy.

8. The process of producing an adherent dielectric coating on aluminum which consists in treating the same without the application of externally applied electrical energy with an aqueous solution containing a strongly alkaline metal base hydroxide, ammonia, and a substantial amount of a salt of an alkali metal having a chemical retarding effect.

In witness whereof, I have hereunto set my hand this 12th day of July, 1929.

FRANK M. CLARK.